(12) United States Patent
Kylväjä

(10) Patent No.: US 10,519,058 B2
(45) Date of Patent: Dec. 31, 2019

(54) METHOD FOR TEMPERING GLASS SHEETS

(71) Applicant: GLASTON FINLAND OY, Tampere (FI)

(72) Inventor: Harri Kylväjä, Pirkkala (FI)

(73) Assignee: GLASTON FINLAND OY, Tampere (FI)

( * ) Notice: Subject to any disclaimer, the term of this patent is extended or adjusted under 35 U.S.C. 154(b) by 21 days.

(21) Appl. No.: 14/945,559

(22) Filed: Nov. 19, 2015

(65) Prior Publication Data

US 2016/0145143 A1     May 26, 2016

(30) Foreign Application Priority Data

Nov. 20, 2014   (FI) ..................................... 20146016

(51) Int. Cl.
*C03B 27/044*     (2006.01)

(52) U.S. Cl.
CPC .................... *C03B 27/044* (2013.01)

(58) Field of Classification Search
CPC . C03B 27/044; C03B 27/0404; C03B 27/048; C03B 27/0417; C03B 27/0413
See application file for complete search history.

(56) References Cited

U.S. PATENT DOCUMENTS

| | | | |
|---|---|---|---|
| 2,866,299 A * | 12/1958 | Long | B28B 21/74 65/115 |
| 3,522,029 A | 7/1970 | Carson et al. | |
| 4,314,836 A * | 2/1982 | Seymour | C03B 27/0404 65/114 |
| 4,400,194 A * | 8/1983 | Starr | C03B 27/0404 65/114 |
| 4,444,579 A | 4/1984 | Dunn et al. | |

(Continued)

FOREIGN PATENT DOCUMENTS

| | | |
|---|---|---|
| EP | 0 003 168 A1 | 7/1979 |
| EP | 1 254 866 A1 | 11/2002 |

(Continued)

OTHER PUBLICATIONS

Finnish Search Report dated Jun. 30, 2015 for Application No. 20146016.

(Continued)

*Primary Examiner* — Queenie S Dehghan
(74) *Attorney, Agent, or Firm* — Buchanan Ingersoll & Rooney PC

(57) ABSTRACT

A method for tempering substantially flat glass sheets. A glass sheet is heated to a tempering temperature and quenching is conducted by blasting cooling air to both surfaces of the glass sheet. The quenching of a top surface and a bottom surface of the glass sheet's both side lanes is commenced earlier or is performed at the early stage of quenching more effectively than the quenching of a top surface and a bottom surface of the glass sheet's middle lane. As a result, the compressive stress required for a desired tempering degree is established on both surfaces of the side lanes earlier than on both surfaces of the middle lane. In order to achieve this, the cooling air enclosures above and below a glass sheet are provided with a subarea of weakened cooling effect.

6 Claims, 4 Drawing Sheets

(56) References Cited

U.S. PATENT DOCUMENTS

Figure 1:
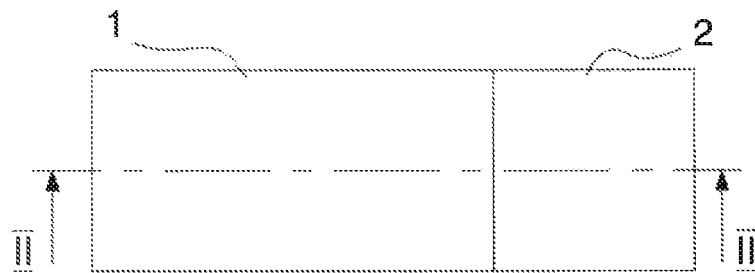

| | | | |
|---|---|---|---|
| 5,397,647 A * | 3/1995 | Kramling | B32B 17/10981 219/203 |
| 2007/0122580 A1 * | 5/2007 | Krall, Jr. | C03B 27/02 428/38 |
| 2009/0110914 A1 * | 4/2009 | Zhuang | C03B 27/0404 428/335 |
| 2009/0173106 A1 * | 7/2009 | Boisselle | C03B 27/0404 65/115 |
| 2011/0154862 A1 | 6/2011 | Fukami et al. | |
| 2013/0019639 A1 | 1/2013 | Saito et al. | |

FOREIGN PATENT DOCUMENTS

| | | |
|---|---|---|
| FR | 2 219 912 A1 | 9/1974 |
| FR | 2 521 122 A1 | 8/1983 |
| GB | 1071555 A | 6/1967 |
| GB | 1 424 954 A | 2/1976 |

OTHER PUBLICATIONS

The extended European Search Report dated Mar. 17, 2016, by the European Patent Office in corresponding European Patent Application No. 15397537.0-1375. (7 pages).

* cited by examiner

METHOD FOR TEMPERING GLASS SHEETS

The invention relates to a method for tempering glass sheets, which comprises heating a glass sheet to a tempering temperature and conducting a quenching step by blasting cooling air to both surfaces of the glass sheet.

Tempering furnaces for glass sheets, wherein the glass sheets are moving in a single direction or back and forth on top of rotating ceramic rollers, and from where the same proceed at a tempering temperature along a roller track to a quenching unit at a tail end of the furnace, in which the quenching is conducted with air jets, are generally known and in service. The roller track-equipped furnace is called in the art for example as a roller hearth furnace. A typical furnace temperature is about 700° C. and the temperature of air used for cooling is typically about the same as the air temperature out-doors or in a factory hall. Cooling air is supplied by a fan or a compressor. In furnaces and quenching units based on air support technology, the glass sheet is floating while being supported by a thin air bed and only comes to contact with conveyor track rollers or other transport elements along one of its side edges. The glass sheet tempering machines based on air support technology are clearly less common and less known than roller track-equipped tempering machines. The furnace based on air support technology is called in the art for example as an air support furnace. The objective of a tempering process is always the same regardless of how the glass sheet is supported. Regardless of the glass sheet supporting practice, it does not eliminate the subsequently described problem of bi-stability, which is resolved by the invention.

The typical tempering temperature for a glass sheet of 4 mm thickness, i.e. the temperature at which the glass proceeds from furnace to quenching unit, is 640° C. The glass tempering temperature can be lowered slightly as the glass thickness increases. The increase of tempering temperature enables the tempering of progressively thinner glass and reduces the cooling capacity required for quenching. On the other hand, merely increasing the tempering temperature from 640° C. to 670° C. establishes on the glass a clearly higher strengthening or tempering degree, i.e. the compressive stress at glass surface increases.

The glass arriving at a tempering process is excellent in terms of its straightness and optical properties. It has typically a glass surface compressive stress of 1-4 MPa. It is an objective in the tempering process to provide the glass sheet with a sufficient increase of strength while compromising as little as possible its straightness and optical properties. In addition to strength, another desirable quality of tempered glass is safety in breaking. Non-tempered glass breaks into large pieces with a laceration hazard. Tempered glass breaks into almost harmless crumbs.

The compressive stress established in tempering at glass surface (degree of strength or tempering) is dependent on the temperature profile of glass in thickness direction as the glass is cooling through a transition temperature range (about 600→500° C.) typical for glass. In this case, the temperature profile in thickness direction assumes a more or less parabolic shape, wherein the temperature difference between the surface and the center of glass is about 100° C. Thinner glass requires more cooling effect for obtaining the same aforesaid temperature difference. For example, the tempering of 3 mm thick glass requires approximately 5 times more cooling fan motor capacity per glass area than the tempering of 4 mm thick glass. For example, the objective for a 4 mm thick glass sheet in tempering is the surface compression of about 100 MPa, whereby the center of glass thickness has a tensile stress of about 46 MPa. This type of glass sheet breaks into sort of crumbs that fulfill the requirements of safety glass standards.

An objective with so-called heat strengthened glass is not to achieve safe breaking characteristics, nor a strength as high (surface compression of about 50 MPa is enough) as in tempered glass. An objective with so-called super-tempered glass is a type of glass clearly stronger than normal tempered glass. In so-called FRG glass (fire resistant glass), for example, the surface compression stress is at least 160 MPa. Heat strengthening will be successful when the cooling effect of air jets in a quenching unit is markedly reduced with respect to tempering. Super tempering will be successful when the cooling effect of air jets in a quenching unit is markedly increased with respect to tempering. Other than that, as a process, heat strengthening and super tempering are similar to tempering. The present invention addresses the same problem also in heat strengthening and super tempering of glass. With a similar type of glass, the problem is less serious in heat strengthening than in tempering and more serious in super tempering than in tempering. In general, all three aforesaid processes can be referred to as heat strengthening or tempering.

It is difficult to detect the warping and bi-stability of a glass sheet present on the rollers of an unloading track at the end of a tempering line as the glass is pressed by gravity to a flat condition against the roller track. The glass straightening effect of gravity disappears as the glass is hoisted to an upright position for example to rest with its side edge against the rollers. This allows for a visual inspection of the glass regarding the straightness of one of its side edges. The glass is visibly straight (see FIG. 8, glass i) or curved in one direction. There are standardized measuring methods and limit values for the curvature (overall flatness) of glass. Slight curving is not a problem. When bending glass while it is in an upright position, the stable glass (see FIG. 8, glass ii) always resumes the same shape after the bending force has disappeared. Bi-stable glass cannot be made straight in the upright position without an external force. When subjected to a force urging it slightly towards straightness, the bi-stable glass bends itself abruptly in the opposite direction to the same curvature as in the beginning. This self-inflicted bending can be perceived on the hands and the resulting sound is audible. Hence, the bi-stable glass has at least two optional shapes reachable thereby in an upright position (see FIG. 8, glass iii). The shape of a bi-stable glass sheet may also include local deformations resulting from the same phenomenon as the bi-stability.

The above-described bi-stability, along with the accompanying warping, is a tempered glass quality problem commonly known in the art. In practice, the tempered bi-stable glass sheet is not acceptable. In general, bi-stability is particularly demonstrated in the tempering of particularly 3-4 mm thick glasses (tempering of thinner glasses is uncommon) when the glasses are relatively large in surface area (at least 0.5 m$^2$) and have a quadratic shape. In order to eliminate bi-stability, the tempering line operator typically adjusts heating of the furnace. Success in this undertaking generally entails that several pieces of glass go to waste as a result of bi-stability and/or related warping or as a result of some other quality defect inflicted by an adjustment procedure, if success can be reached at all. Success depends on the operator's skills and the capability of a furnace. As the glass thickness keeps reducing from 3 mm, the problem becomes more severe. In pre-invention tests, the problem was found so severe that its elimination by adjusting the furnace was no longer possible. The bi-stability problem also becomes more prominent as the size of a glass sheet increases, as the glass becomes more quadratic (i.e. the length of glass approaches its width), and as the tempering degree of glass increases.

Publication GB 1 071 555 discloses a method and apparatus for producing a bent tempered glass sheet by conducting the bending through making use of unequal stresses generated intentionally in various areas and on opposite surfaces of the glass sheet. In an initial cooling section, just the upper surfaces of a glass sheet's end areas are subjected to cooling in order to produce a temporary upward curving of these areas. In the actual quenching section, the top and bottom surfaces of a glass sheet are subjected to cooling with unequal cooling effects for providing the glass sheet's opposite surfaces with unequal compression stresses and thereby achieving a desired curing or bending of the glass sheet. Accordingly, the purpose here is not to resolve the bi-stability problem of a flat glass sheet.

Bi-stability is a result of stresses existing in a glass sheet and differences thereof at various parts of the glass. In other respects, the theory regarding the development of bi-stability in a flat glass sheet is not generally known in the art. The invention is based on new empirical information. Benefits of the invention have been demonstrated in practical trials.

An objective of the invention is to provide a method, enabling thin (thickness less than 6 mm, especially less than 3 mm) large (more than 0.5 $m^2$, especially more than 1 $m^2$) heat-strengthened, tempered and super-tempered glass sheets to be made stable and straight.

This object is attained with a method of the invention on the basis of the characterizing features presented in the appended claim 1. Preferred embodiments of the invention are presented in the dependent claims. In the claims, the term tempering is used generally in reference to the significant strengthening of glass based on a heat treatment.

Figure 2:
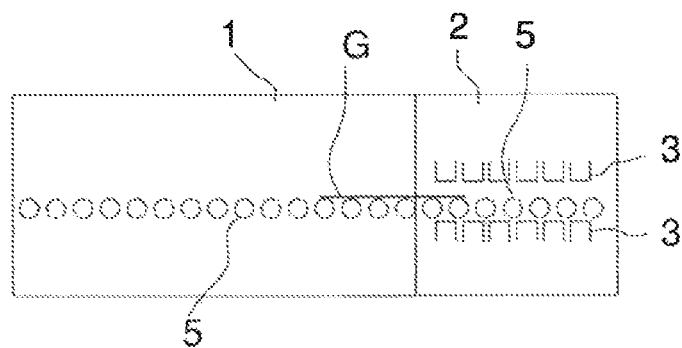
Figure 3:
Figure 4:
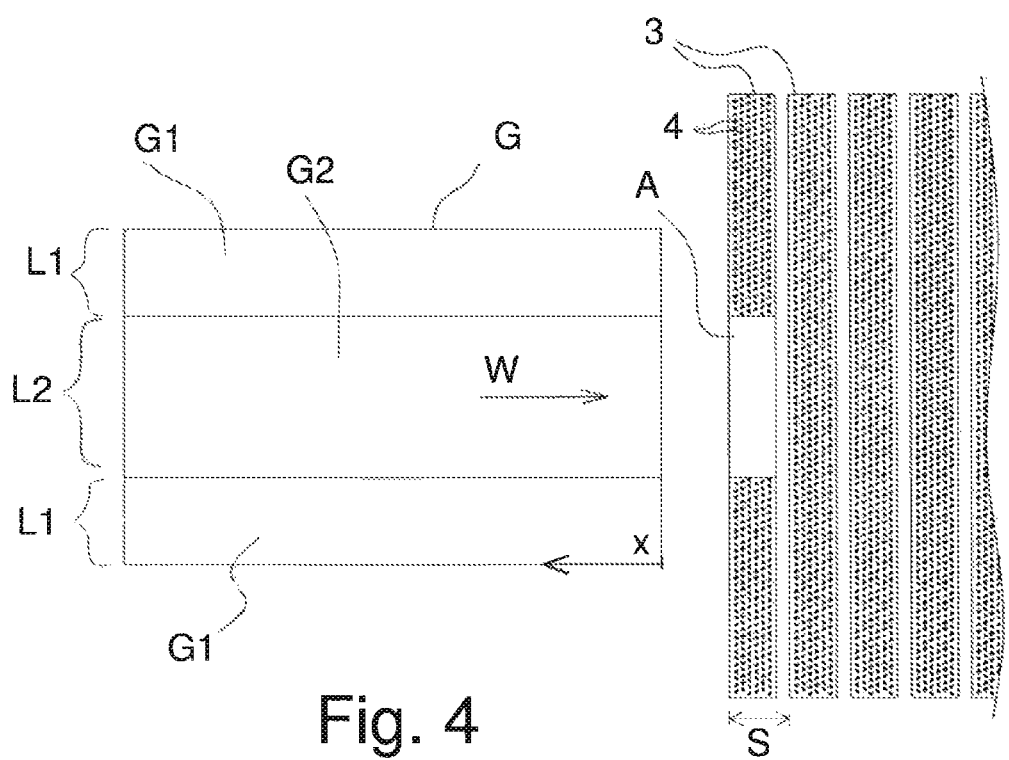
Figure 5:
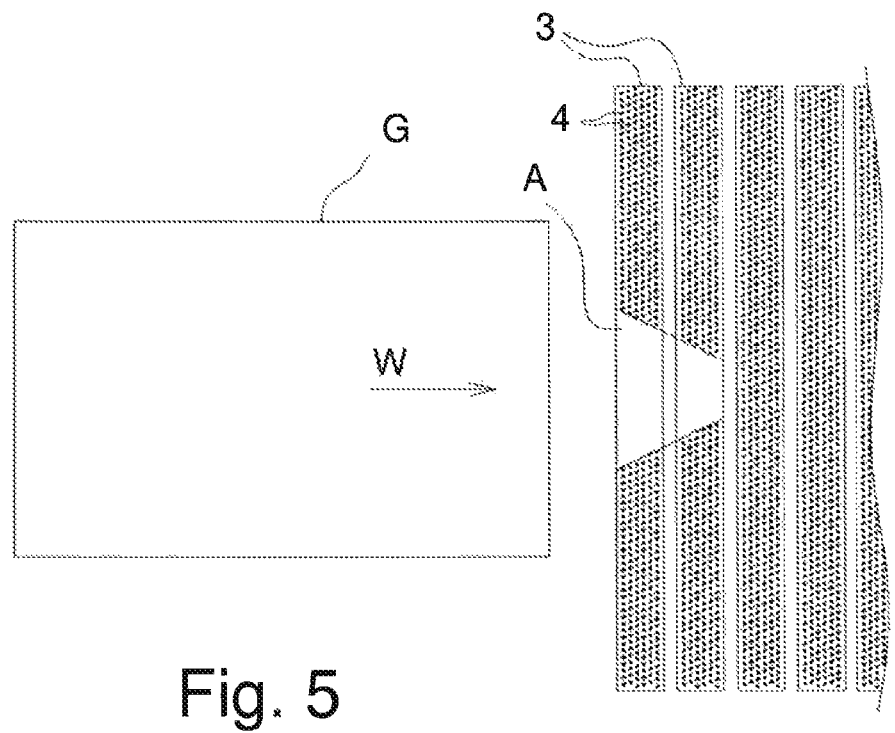
Figure 6:
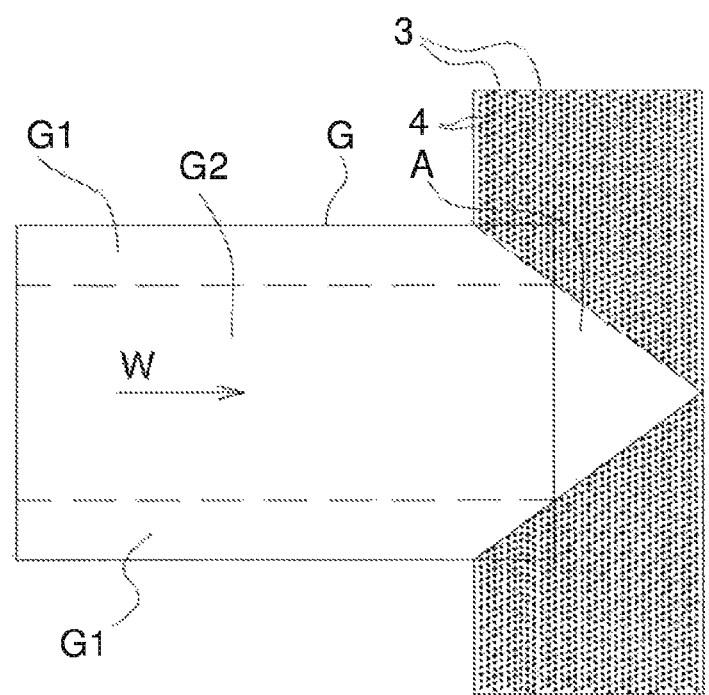
Figure 7:
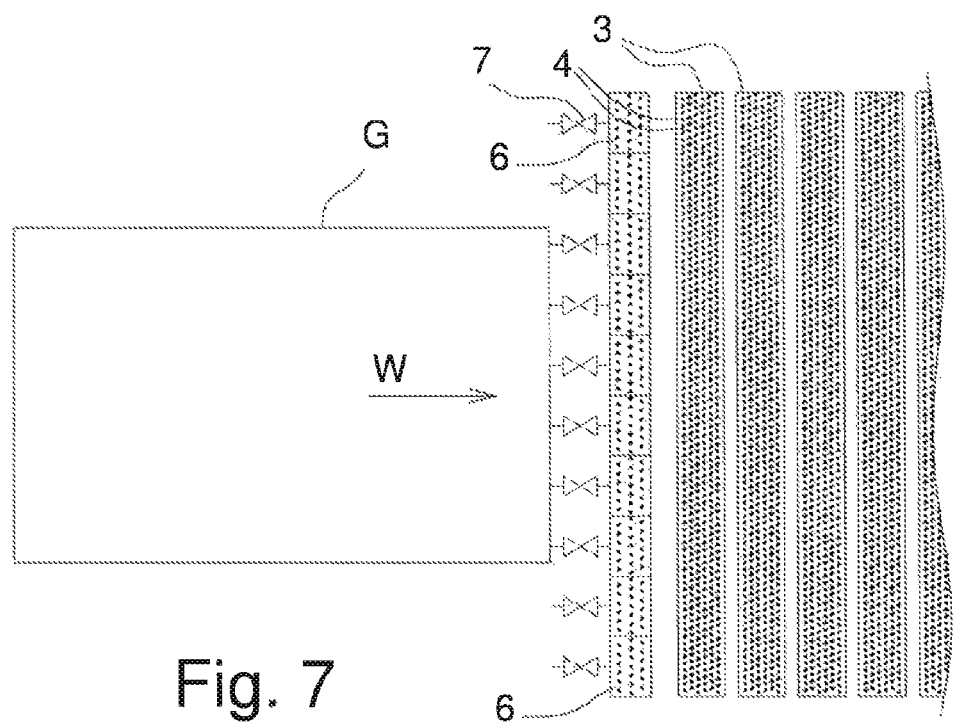
Figure 8:
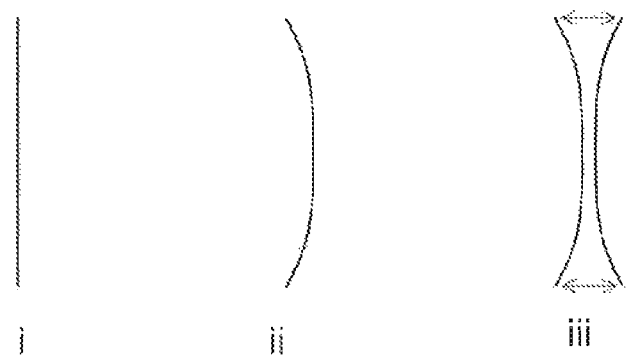

The invention will now be described more closely with reference to the accompanying drawings, in which FIG. 1 shows, schematically in a plan view, sections of an apparatus intended for executing the method, FIG. 2 shows the apparatus in a longitudinal section along a line II-II in FIG. 1, FIG. 3 shows a cooling air enclosure of the apparatus along with its blast openings, FIG. 4 shows cooling air enclosures, along with blast openings thereof, for the apparatus according to a preferred embodiment of the invention, in a view from a direction normal to the glass surface, FIG. 5 shows a variant for the apparatus of FIG. 4, FIG. 6 shows a taper-shaped subarea in a long blasting enclosure, FIG. 7 shows a cooling air enclosure divided into sections 6, said sections being provided with valves 7, and FIG. 8 shows the shape and bi-stability of glass as seen in the direction of a glass sheet's plane.

The apparatus for executing the method comprises a furnace 1 and a quenching unit 2, which are successive in a glass sheet traveling direction in said sequence according to FIG. 1. The furnace 1 is provided with typically horizontal rollers 5 or an air support table along with its conveyor elements. These make up a conveyor track for the glass sheet. A glass sheet G to be heated is driven continuously in the furnace at a constant speed in one direction or back and forth for the duration of a heating cycle. Having been heated to a tempering temperature, the glass sheet proceeds from the furnace 1 to the quenching unit 2 at a transfer speed W, which is typically higher than the motion speed of glass in the furnace 1. Typically, the transfer speed is 300-800 mm/s and remains constant at least for as long as the glass has cooled to below the aforesaid transition temperature range. For example, each part of a 3 mm thick glass is required to dwell in quenching at least for the period of about 3 seconds. At a transfer speed of 600 mm/s, for example, this would require a quenching unit 2 with a length of not less than about 1800 mm.

The quenching unit 2 is provided with typically horizontal rollers 5 and cooling air enclosures 3 above and below the rollers, as in FIG. 2. When the furnace 1 is an air support surface, the rollers 5 or the air support table, along with its conveyor elements, are in the quenching unit 2 typically in a slightly inclined position relative to a horizontal direction transverse to a motion direction of the glass G. The cooling air enclosures 3 are provided with blast openings 4 from which the cooling air discharges in jets towards the glass G. The blast openings 4 are typically circular holes and typically set successively in rows, as in FIG. 3. The blast openings 4 can also come in other shapes, for example in slot shapes.

FIG. 4 illustrates a glass sheet in the process of passing into a quenching unit 2 operating with the method of the invention. In FIG. 4, the first cooling air enclosure 3 in the motion direction of glass comprises a subarea (A) weakened in terms of its cooling capacity, and thereby also in terms of its cooling effect, and having a width L2. The cooling capacity is adapted to be weaker as compared to the cooling capacity of the cooling air enclosures 3 outside the subarea (A) over a surface area equivalent to the subarea (A). This weakening of cooling capacity can be carried out e.g. by closing, spacing, or reducing the size of blast openings. In a lateral direction of glass (=a horizontal direction perpendicular to the motion direction of glass), the subarea (A) has a boundary which is sharp with respect to the rest of the area. The sharpness of the boundary can be moderated for example by adding inside the area (A), along its lateral edges (=edges adjacent to side lanes G1 of the glass), blast openings 4 which are smaller than those outside the subarea A. The aforesaid sharpness of the boundary is also reduced by narrowing the width of the subarea (A) in the motion direction of a glass, because the glass is moving at the speed W and, therefore, a single row of blast openings 4 is not enough for tempering the glass.

The subarea A with a weakened cooling capacity is necessary in the cooling air enclosures 3 present above and below a glass sheet for the tempered glass sheet to be flat and straight. In the apparatus according to a preferred embodiment of the invention, the subarea (A) of weakened cooling capacity is substantially identical in cooling air enclosures 3 both above and below the glass sheet and is disposed symmetrically in the middle of a glass sheet in a direction perpendicular to the motion direction of the glass sheet. The cooling air enclosures 3, and the cooling effects thereof, become in the motion direction of the glass G, after the subarea (A), identical to each other across the entire width of the glass G, as depicted in FIG. 4.

Examined now is the passage of a glass G to quenching in FIG. 4. In the weakened subarea (A) there is not a cooling capacity sufficient for a desired degree of tempering, i.e. there occurs no quenching. Therefore, each unit length of a middle lane (G2) of the glass arrives at quenching a time period t=S/W later than the corresponding, i.e. the same x coordinate possessing unit length of a side lane (G1). Hence, the weakened subarea (A) delays the arrival of the middle lane (G2) of glass at quenching with respect to the side lanes (G1). As a result, the side lanes (G1) of glass cool down sooner and tempering stresses are generated therein earlier than in the middle lanes (G2).

FIG. 5 shows a subarea (A), which is weakened in terms of its cooling capacity and thereby also in terms of its cooling effect and which is established in two successive cooling air enclosures 3 and which becomes narrower in the traveling direction of glass. The cooling air enclosures 3 are at an upstream end of the quenching unit 2 as seen in the traveling direction of glass. Narrowing of the subarea (A) may occur in a stepwise or linear manner or as an intermediate thereof. The laterally directed profile of cooling capacity can also be changed in ways other than by changing the width of the subarea. Such ways include e.g. gradual changes of the size, density, or blowing direction of the blast openings 4 when progressing in the motion direction of glass and/or towards the side edges of the subarea (A).

FIG. 6 shows a subarea (A), which becomes narrower in a taper-like manner in the traveling direction of a glass sheet and which is housed in a long blasting enclosure 3 covering the quenching area partially or completely. The subarea (A) is only present over a short stretch of the quenching unit's length of which only the initial portion is shown. Typically, the subarea (A) is located at a start of the quenching unit 2 over a distance of the first 0-60 cm and its length in the motion direction of glass is at least equal to the diameter of a blast opening and not more than 60 cm. This location of the subarea (A) applies also to the exemplary embodiments of FIGS. 4 and 5. The exemplary embodiment of FIG. 6 nevertheless differs from these in the sense that there is no distinct boundary between the side lanes and the middle lane but, instead, the invention comes to fruition with arbitrarily selected lane widths. Indicated with dashed lines in FIG. 6 is a suggested selection for the side lanes G1 and the middle lane G2. This and also other lane width selections fulfill a characterizing feature of the invention that the quenching of a top surface and a bottom surface of the side lanes is commenced earlier or is performed at an early stage of quenching more effectively than the quenching of a top surface and a bottom surface of the glass sheet's middle lane. As a result, the compression stress required for a desired tempering degree is generated on both surfaces of the side lanes earlier than on both surfaces of the middle lane.

In the exemplary embodiment of FIG. 7, the first blasting enclosure is divided into enclosure sections 6, which are provided with valves 7 that can be used for adjusting the amounts of cooling air to be blasted through the enclosure sections 6. In addition, by way of discrete inlets, the enclosure sections 6 can be supplied with cooling air whose temperature profile in a lateral direction of the quenching unit is as desired, particularly such that the weakening of cooling capacity is conducted entirely or partially by increasing the temperature of the blast locally in the subarea (A). The enclosure sections, placed successively in a direction perpendicular to the traveling direction of glass, are short, e.g. 5 cm, in a typical embodiment.

Furthermore, next described will be preferred or optional implementation practices of the invention, which, as appropriate, apply to all above-described embodiments.

The subarea (A) of weakened cooling effect has a width of not less than 20% with respect to the width of glass, but can be considerably larger, preferably more than 60%, even more than 90%, of the width of a glass sheet.

Regarding the middle lane (G2) of a glass sheet advancing in the quenching unit, the quenching is commenced on both surfaces of the glass sheet at least 2 cm, even more than 4 cm, after the edge lanes (G1).

In the motion direction of a glass sheet (G) downstream of the subarea (A) adapted to be weaker in terms of its cooling capacity, the cooling arrangement and the cooling effect achieved thereby are substantially identical across the entire width of the glass sheet (G).

In the subarea (A) of weakened cooling capacity and effect, the total surface area of blast openings 4 can be smaller than the total surface area of blast openings included in a similar size area of the cooling air enclosure outside the subarea. The reduction of a total surface area of the openings can be effected by reducing the diameter of blast openings 4 and/or by reducing the number of blast openings 4 and/or by closing some blast openings 4 completely or partially.

The weakening of cooling capacity can be effected completely or partially by reducing the discharge pressure of blasting jets in the subarea (A) that has been weakened in terms of its cooling capacity. In particularly preferred case, the weakening of cooling capacity in the subarea (A) can be effected completely or partially by means of a barrier placed in the way of blasting jets discharging from the blast openings 4. This also provides a possibility of adjusting the weakening of cooling capacity as the barrier is adapted to be movable either manually or automatically. The same applies also to implements, such as a displaceable perforated damper, used for closing the blast openings partially or completely.

It is also possible that the weakening of cooling capacity be effected completely or partially by increasing a blasting distance between the blast openings (4) in the subarea (A) and the glass (G) as compared to a blasting distance outside the subarea (A). This arrangement can be brought about by increasing a vertical distance between the glass (G) and the blasting jets and/or by changing the direction of blasting jets.

The heat transfer coefficient produced by blasting on the side lanes (G1) of a glass sheet in a lateral direction of the quenching unit (2) on both sides of the weakened subarea (A) is substantially equal to the heat transfer coefficient of the rest of the quenching unit (2) on the glass, and the heat transfer coefficient produced by blasting in the weakened subarea (A) on the middle lane (G2) of a glass sheet is on average at least 20% lower than that.

It is essential that, in a direction perpendicular to the motion direction of a glass sheet, the subarea (A) of weakened heat transfer be located substantially symmetrically in the middle of the glass sheet. It is also preferred that the subarea (A) of weakened heat transfer be substantially identical on both surfaces of a glass sheet. This assists in achieving the bi-stability of a flat glass sheet.

The cooling capacity of a blast occurring by way of the blast openings (4) is preferably adapted to be such that, as a result thereof, both surfaces of a glass sheet are permanently left with a substantially equal compressive stress with a magnitude of at least 50 MPa.

In order to avoid unnecessary differences in compressive stresses, it is preferred that the cooling capacity and the cooling effect in a lateral direction of the glass (G) not undergo a sharp change at the boundary of the weakened subarea (A) but, instead, the cooling capacity and the cooling effect are adapted to be of a gradually changing type. This gradual changing can be promoted for example by adapting the width of the weakened subarea (A) and/or the profile of cooling effect to be variable in the motion direction of glass.

EXAMPLE

When, for example in glass with a thickness of 2.1 mm, the heat transfer coefficient produced by blasting is 1000

W(m²K), blasting air temperature is 30° C., glass tempering temperature is 690° C., glass motion speed is W=600 mm/s, and quenching commences on middle lane 7.2 cm after side lanes, the surface of glass in side lanes has cooled 88° C. (to the temperature of 602° C.) and the entire glass thickness on average 23° C. (to the average temperature of 667° C.) by the time the quenching of glass only begins on a middle lane of the glass.

The invention would perhaps be unnecessary should the entire surface area of glass cool through the aforesaid transition range in an exactly consistent manner (i.e. at the same speed, simultaneously, and with a consistent temperature profile in the thickness direction), thereby not developing stress differences in the direction of glass surface either. In this case, the tempering stresses would also be established across the entire glass surface area at exactly the same time. In practice, the aforesaid exact simultaneity does not occur. With the invention, the glass is subjected to tempering stresses in such a sequence which, according to practical experiments, is correct from the standpoint of eliminating bi-stability.

In this disclosure, the length direction of a quenching unit or a glass sheet is a direction parallel to the glass sheet's motion. The start of a quenching unit is a part of the quenching unit at which the glass is to arrive first. The lateral direction of a glass sheet or a quenching unit is a horizontal direction perpendicular to the glass sheet's motion direction. In the foregoing, the middle lane of a glass sheet refers to a middle portion of the glass sheet co-directional with its motion, and the side lane refers to a portion of the lateral edge co-directional with the glass sheet's motion. The cooling capacities (unit W/m²) needed for tempering fluctuate a great deal, depending on the thickness of and the tempering degree desired for a glass sheet. Therefore, the invention involves the examination of relative cooling capacities in various parts of the quenching unit. Thus, because the issue is not about absolute but, instead, relative cooling capacities, it is just as relevant to speak about cooling effects in various parts of the glass sheet. Accordingly, when speaking about cooling capacity, it is actually cooling efficiency and cooling effect that are meant at the same time. The heat transfer coefficient is obtained by dividing the cooling capacity with the temperature difference between glass and air.

The invention claimed is:

1. A method for tempering glass sheets to safety glass which fulfills the requirements of safety glass standards, which comprises:

heating a glass sheet to a tempering temperature, the glass sheet having a middle lane, and opposing peripheral side lanes on each lateral side edge of the middle lane, the peripheral side lanes extending to a periphery of the glass sheet, and the glass sheet being flat and straight; and quenching the glass sheet as it is moving through a quenching unit by blasting cooling air to both a top surface and a bottom surface of the glass sheet, wherein, the quenching of the top surface and the bottom surface of the peripheral side lanes of the glass sheet is commenced earlier or performed in a beginning of the quenching with a higher heat transfer coefficient than the quenching of a top surface and a bottom surface of the middle lane of the glass sheet such that the compressive stress required for a pre-determined tempering degree of the safety glass standards is established on both the top and bottom surfaces of the peripheral side lanes earlier than on both the top and bottom surfaces of the middle lane, wherein, after the earlier stage of quenching, a cooling efficiency of the middle lane is changed to be substantially identical with a cooling efficiency across an entire width of the glass sheet and said change of cooling efficiency of the middle lane at a lengthwise position of the glass sheet takes place when less than 1 second has passed from arrival of said lengthwise position into the quenching unit, wherein a quenching efficiency at the peripheral side lanes at the earlier stage is substantially the same as a quenching efficiency at the entire width of the glass sheet after the earlier stage such that the quenching efficiency provides the compressive stress required for the pre-determined tempering degree, wherein the quenching step reduces bi-stability of the tempered glass sheet; and wherein the quenching step is configured such that the tempered glass sheet breaks into crumbs meeting requirements of safety glass standards, and the method further comprising transferring the glass sheet to the quenching unit at a transfer speed of 300-800 mm/s.

2. A method according to claim 1, wherein the middle lane has a width which is at least half of the entire width of the glass sheet, and the quenching is commenced on both the top and bottom surfaces of the middle lane of the glass sheet after quenching of the peripheral side lanes of the glass sheet for at least 2 cm in a glass conveying direction.

3. A method according to claim 1, wherein the middle lane has width which is at least 70% of the entire width of the glass sheet, and the quenching is commenced on both the top and bottom surfaces of the middle lane of the glass sheet after quenching of the peripheral side lanes of the glass sheet for at least 4 cm in a glass conveying direction.

4. A method according to claim 1, wherein the glass sheet comprises a thin planar glass sheet and said method further comprises tempering the thin glass sheet with a thickness of not more than 4 mm to a surface compression stress of up to about 100 MPa.

5. A method according to claim 1, wherein the glass sheet comprises a thin planar glass sheet and said method further comprises tempering the thin glass sheet with a thickness of 4 mm to a surface compression stress of about 100 MPa.

6. A method according to claim 1, wherein the quenching of the top surface and the bottom surface of the peripheral side lanes of the glass sheet being commenced earlier or performed with a higher heat transfer coefficient than the quenching of the top surface and the bottom surface of the middle lane of the glass sheet provides a profiled quenching, the profiled quenching on the glass sheet beginning at a start of the quenching unit over a distance of the first 0-60 cm.

* * * * *